Patented Feb. 8, 1949

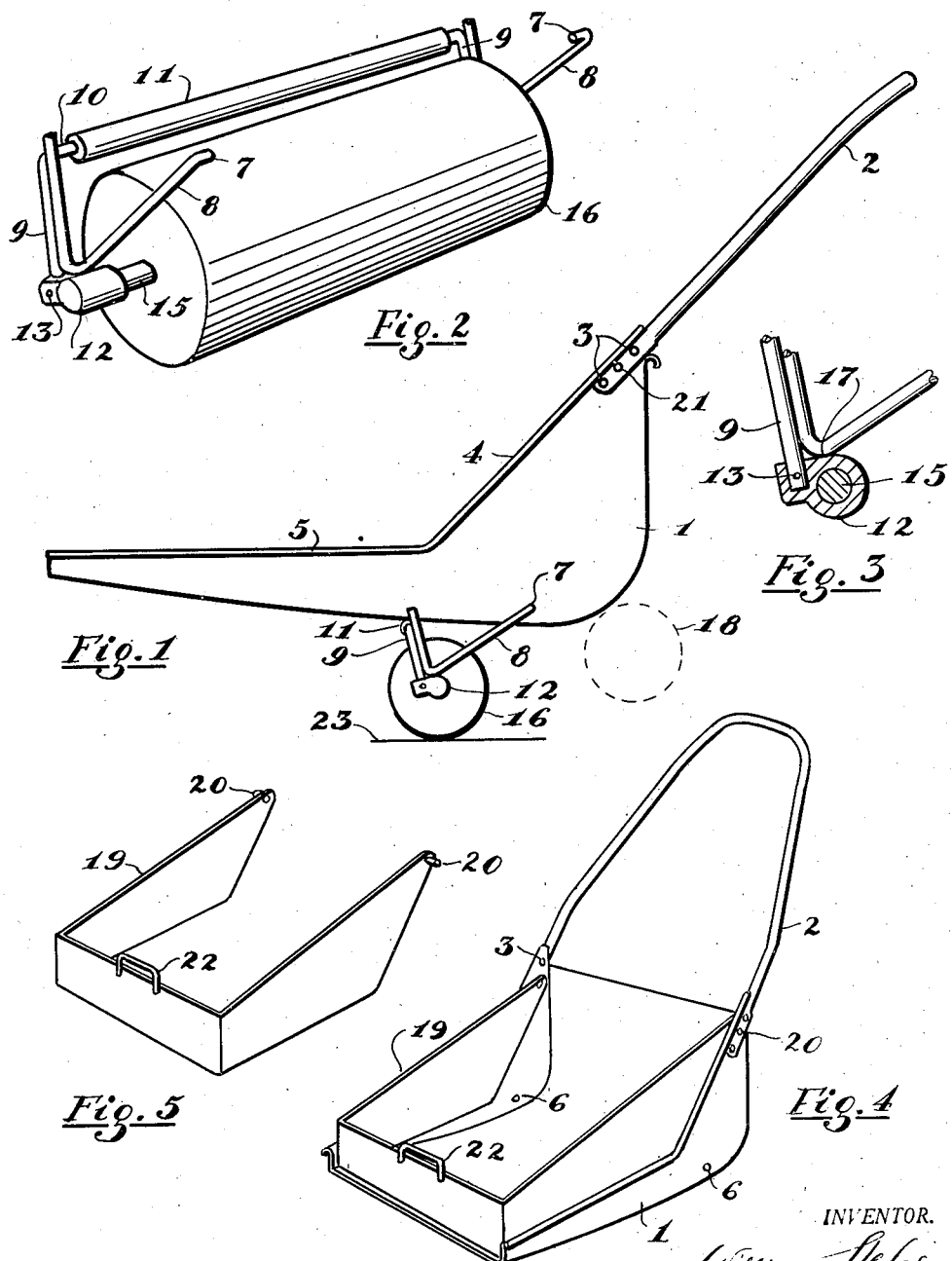

2,461,353

UNITED STATES PATENT OFFICE 2,461,353

GARDEN CART

William Stelzer and Madelon J. Stelzer, Summit, N. J.

Application February 10, 1947, Serial No. 727,628

6 Claims. (Cl. 280—52)

The invention relates to garden carts and more particularly to a combination garden cart, hand truck, lawn roller, sled, and snow scoop. It is related to the invention disclosed in the co-pending application of William Stelzer, Serial No. 569,508, filed December 23, 1944, now Patent No. 2,433,246, issued December 23, 1947.

The object of this invention is to provide a novel hand truck or garden cart with a receptacle having sides suitable for carrying boxes or other objects in the fashion of a hand truck.

Another object is to provide a pivoted removable frame or gate to increase the carrying capacity of the receptacle for bulky material.

A further object is to provide a lawn roller instead of wheels to increase the usefulness of the cart for garden purposes. The aim to make the roller readily removable so that the cart can quickly be changed into a scoop for snow removal or other uses, and to provide means so that the roller can be shifted into another position during operation of the cart.

A further object is to eliminate the conventional legs as used on wheel barrows and carts and to provide a tray having a low belly adapted to rest on or skid over the ground. In addition to a low center of gravity and consequent greater stability the advantages thereby attained are a sleek construction which facilitates passage over obstacles which with present conveyances would not be negotiable.

The invention also aims to provide other novel features to produce a cart of simplified and cheaper construction that can be changed for the different purposes without the use of tools and with a minimum of effort.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a side elevation of the novel cart;

Fig. 2, a perspective view of the roller and its supporting structure;

Fig. 3, an enlarged fragmentary view of the bearing and the supporting structure, the bearing and journal being shown in section;

Fig. 4, a perspective view of the cart where the roller is removed and a frame is added; and Fig. 5, a perspective view of the frame alone.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

In the preferred embodiment the cart comprises a receptacle or tray 1 to whose sides is attached a handle 2 by means of rivets, or bolts 3. The sides of the tray have reinforced edges 4 continuing the contour of the handle and extending forwardly at 5 to serve as a carrying member similar in function to the toe plate of a hand truck. Holes 6 receive the ends 7 of resilient arms 8 which have one end welded or otherwise secured to the legs 9 of a crossmember 10 provided with a rubber cushion 11 to prevent telephoning sound from the roller structure to the tray. The lower extremeties of the legs 9 rest in a hole in bearings 12 and are secured to it by a pin or other suitable means 13. These bearings serve to support the trunnions or journals 15 of roller 16. Thus the load of the receptacle is transmitted to the roller through the lower ends of legs 9 and through arms 8 at 17, whereby a certain degree of self-alignment of the bearings is obtained, especially since some play is provided in the hole in which legs 9 rest. The supporting members 8 and 9 are preferably made of metal rods having a certain amount of resiliency so that assembly and removal of the supporting structure from the tray can be accomplished by pulling arms 8 apart. As the roller 16 is attached to the tray merely through ends 7, it is free to swing about pivot holes 6 between the position shown and the extreme position indicated by dotted line 18.

In order to increase the carrying capacity of the cart for bulky material I provide a gate or frame 19 as shown in Fig. 5. It has trunnions 20 extending laterally to engage holes 21 as shown in Fig. 4, whereby the frame may be lifted up by handle 22 and pivoted about the axis of trunnions 20 to facilitate dumping. The frame is preferably of resilient material so that it may be attached to or removed from the tray by springing the ends which carry the trunnions together.

In operation, the novel device may be converted into a scoop or shovel by removing the roller and arm assembly by merely unhooking trunnions 7 from holes 6, and by removing frame 19 or folding it up against handle 2. This scoop lends itself ideally to convey loads by skidding over wet or muddy ground or over snow. When using it to make a path through snow, it is pushed, and the snow dumped to the side after the tray is filled up.

When considering the construction as shown in Fig. 1 the position illustrated relative to the ground line 23 would be assumed when the cart is being pushed or pulled. In a loading position the cart may be tilted rearwardly so that the ground line would be tangent with the roller and the curved rearward portion of the receptacle, or it may be tilted forwardly so that the forward lip rests on the ground. The latter position is suitable for sweeping material into the cart, or in using it in the fashion of a hand truck.

While the garden cart in any of its transformations can be either pushed or pulled whereby it may travel forward or backwards, in order to simplify the terms of the claims the forward lip of the receptacle shall be considered the front of the vehicle and the handle at the rear.

Having thus described our invention, we claim:

1. A hand truck having a scoop shaped receptacle, handle means secured thereto, said receptacle having a belly at its rearward portion and being open at its forward end, a roller arranged underneath said receptacle and forward of said belly, and means for revolubly supporting said roller, said latter means being pivoted to said receptacle aft of the axis of said roller and having a member to butt against the underside of said receptacle to keep said roller distanced from said receptacle.

2. A hand truck having a scoop shaped receptacle, handle means secured thereto, said receptacle having a belly at its rearward portion and being open at its forward end, a roller arranged underneath said receptacle and forward of said belly, arms pivotally secured to said receptacle aft of the axis of said roller, means secured to said arms for revolubly supporting said roller, members to transmit the load from said receptacle to said roller, and cushioning means between said members and said receptacle to prevent the transmission of road noise to said receptacle.

3. A hand truck having a scoop shaped receptacle, a handle secured thereto, a roller arranged under the middle portion of said receptacle, and roller supporting means to revolubly support said roller, said roller supporting means having rearwardly extending resilient members, the ends of said members being pivoted to said receptacle, said members being constructed to yieldingly tend to remain in engagement with said receptacle to facilitate the easy removal of the roller and roller supporting means, the latter having a cushioned stop to prevent the roller from touching the underside of the middle portion of said receptacle but permitting the roller and roller supporting means to swing about the pivots to a rearward position where said roller may contact the rearward portion of said receptacle.

4. A garden cart having a scoop shaped receptacle, a handle secured thereto, a lawn roller arranged under the middle portion of said receptacle, means pivotally secured to said receptacle to revolubly support said lawn roller, the pivotal axis being aft of the axis of said lawn roller and parallel thereto, and a removable frame pivotally secured to said receptacle at the rearward portion thereof to increase the carrying capacity of said receptacle.

5. A garden cart having a scoop shaped receptacle, a handle secured thereto, a lawn roller arranged under the middle portion of said receptacle, means pivotally secured to said receptacle to revolubly support said lawn roller, the pivotal axis being aft of the axis of said lawn roller and parallel thereto, cushioned means to space said lawn roller from the underside of said receptacle, a frame pivotally and removably secured to said receptacle, the pivot points of said frame being at the rear portion of said receptacle, and handle means on said frame to facilitate lifting it up prior to dumping of said receptacle.

6. A combination garden cart, hand truck, lawn roller, scoop, and sled, comprising a scoop shaped receptacle having an open forward lip, parallel side walls and a curved bottom bent upwardly at the rear to form a belly, handle means extending upwardly and rearwardly from said receptacle, each of said side walls having a reinforced rim extending in alignment with said handle means in the rear and extending fore and aft in the front to provide the general characteristics of a hand truck, a roller to serve as a lawn roller arranged underneath the bottom of said receptacle a spaced distance therefrom, a supporting structure having bearings to rotatably support said roller, resilient arms extending rearwardly from said supporting structure and removably and pivotally secured to said receptacle so that said roller may swing about the pivots from the usual spaced distance underneath said receptacle to a rearward position where the roller rests against the rear portion of said receptacle, a frame comprising two sides and a front wall to extend the sides of said receptacle and to increase the carrying capacity, pivots at the rear end of said frame sides to pivot said frame to said receptacle at the rearward portion of the latter, means to facilitate easy removal of said frame from said receptacle, and handle means attached to said frame to facilitate lifting up the latter when dumping said receptacle.

WILLIAM STELZER.
MADELON J. STELZER.

REFERENCES CITED

The following references are of record in the file of this patent:

UNITED STATES PATENTS

| Number | Name | Date |
| --- | --- | --- |
| 401,381 | Schubert | Apr. 16, 1889 |
| 1,701,486 | Askren | Feb. 5, 1929 |
| 2,308,045 | Budwig | Jan. 12, 1943 |

FOREIGN PATENTS

| Number | Country | Date |
| --- | --- | --- |
| 189,311 | Great Britain | Nov. 30, 1922 |